United States Patent
Wang et al.

(10) Patent No.: US 10,081,779 B2
(45) Date of Patent: Sep. 25, 2018

(54) METHOD OF SEPARATING OIL

(71) Applicant: Croda, Inc., Edison, NJ (US)

(72) Inventors: Min Ma Wang, Kennett Square, PA (US); Craig Michael Sungail, Chadds Ford, PA (US); Xin Chen, Hockessin, DE (US)

(73) Assignee: CRODA, INC., Edison, NJ (US)

( * ) Notice: Subject to any disclaimer, the term of this patent is extended or adjusted under 35 U.S.C. 154(b) by 0 days.

(21) Appl. No.: 15/541,939

(22) PCT Filed: Jan. 8, 2016

(86) PCT No.: PCT/US2016/012585
§ 371 (c)(1),
(2) Date: Jul. 6, 2017

(87) PCT Pub. No.: WO2016/114983
PCT Pub. Date: Jul. 21, 2016

(65) Prior Publication Data
US 2017/0369815 A1    Dec. 28, 2017

Related U.S. Application Data

(60) Provisional application No. 62/104,183, filed on Jan. 16, 2015.

(51) Int. Cl.
| | | |
|---|---|---|
| C11B 1/10 | (2006.01) | |
| C11B 13/00 | (2006.01) | |
| B01D 17/04 | (2006.01) | |
| C12F 3/10 | (2006.01) | |

(52) U.S. Cl.
CPC .............. *C11B 1/10* (2013.01); *B01D 17/047* (2013.01); *C11B 13/00* (2013.01); *C12F 3/10* (2013.01); *Y02W 30/74* (2015.05)

(58) Field of Classification Search
CPC ......... C11B 1/10; C11B 13/00; B01D 17/047; C12F 3/10
See application file for complete search history.

(56) References Cited

U.S. PATENT DOCUMENTS

| | | | |
|---|---|---|---|
| 2,544,725 A | 3/1951 | Rider et al. | |
| 6,379,723 B1 | 4/2002 | Samuelsson | |
| 6,566,305 B1 * | 5/2003 | Milius | A01N 25/02 504/116.1 |
| 7,026,363 B2 * | 4/2006 | Leinweber | B01D 17/047 210/708 |
| 7,566,469 B2 | 7/2009 | Scheimann | |
| 8,008,517 B2 | 8/2011 | Cantrell et al. | |
| 8,168,037 B2 | 5/2012 | Winsness | |
| 8,841,469 B2 | 9/2014 | Shepperd et al. | |
| 2012/0125859 A1 | 5/2012 | Collins et al. | |
| 2014/0155639 A1 | 6/2014 | Stricklen et al. | |
| 2014/0228456 A1 | 8/2014 | Bevinakatti et al. | |
| 2015/0284659 A1 * | 10/2015 | Young | C11B 3/006 554/204 |

FOREIGN PATENT DOCUMENTS

| | | |
|---|---|---|
| EP | 1094704 | 10/2003 |
| WO | 2012128858 | 9/2012 |
| WO | 2015157273 | 10/2015 |

OTHER PUBLICATIONS

International Search Report dated Mar. 17, 2016 in related application PCT/US2016/012585.
International Preliminary Report on Patentability and Written Opinion for International Application No. PCT/US2016/012585, dated Jul. 18, 2017, 7 pages.

* cited by examiner

*Primary Examiner* — Yate' K Cutliff
(74) *Attorney, Agent, or Firm* — RatnerPrestia

(57) ABSTRACT

A method of separating oil from a composition containing an oil and water emulsion, by adding a separation additive which is a mixture of a fatty ester of an alkoxylated polyol and a fatty ester of alkoxylated glycerol, and performing at least one oil separation step. The method is particularly suitable for separating corn oil from stillage produced in a corn ethanol mill.

17 Claims, No Drawings

US 10,081,779 B2

METHOD OF SEPARATING OIL

CROSS REFERENCE TO RELATED APPLICATIONS

This application is the National Stage filing of International Appln. No. PCT/US2016/012585, filed 8 Jan. 2016, and claims priority of U.S. Provisional Patent Application No. 62/104,183, filed 16 Jan. 2015, the entirety of which applications is incorporated herein by reference for all purposes.

This application is related to, and claims the benefit of priority of, U.S. Provisional Application No. 62/104,183, entitled METHOD OF SEPARATING OIL, filed on 16 Jan. 2015, the contents of which are incorporated herein by reference in their entirety for all purposes.

FIELD OF INVENTION

The present invention relates to a method of separating oil from an emulsion containing composition, preferably a biomass, particularly stillage, using a separation additive which is a mixture of ester alkoxylates.

BACKGROUND

There is growing interest in the use of bioethanol to supplement fossil fuels as an energy source in transport. For example, ethanol accounted for 9% of gasoline consumption in the USA in 2009, and 90% of the ethanol produced in the USA in 2009 was produced using corn as feedstock. The majority of existing corn ethanol mills, and almost exclusively all the corn ethanol mills commissioned in recent years, are so called "dry mills".

A "dry mill" plant processes corn into ethanol through a dry grinding process. The ground corn is mixed with water to form mash, and then an enzyme is added to convert corn starch into sugar. A fermentation process is followed to convert the sugar into ethanol. The liquid intermediate, called "beer," is further processed by distillation and ethanol is collected. The leftover in the "beer" after the removal of ethanol is called stillage, which contains water, protein, nutrients, fibre, and corn oil. The stillage includes an aqueous phase and an oil phase. The corn oil may be separated from the stillage by using a centrifuge and collected as a higher value co-product. A separation additive may be added into the stillage to enhance the separation of the oil phase from the water phase and increase the corn oil yield.

Ethanol plants may treat whole stillage from the "beer" column via centrifugation to produce wet cake and thin stillage, and further treat the thin stillage stream by subjecting it to multiple effect evaporation to increase the solids content and recover the distillate for return use in the process. As the solids content increases, the thin stillage is typically referred to as syrup. The syrup is typically combined with wet cake or distillers' dry grains (DDG) and sold as animal feed.

The corn oil yield from a stillage depends on many factors, such as corn kernel quality, water content, the particle size of the solids in the stillage, the process temperature of the stillage in the centrifuge, and the design of the separation equipment. The use of a corn oil separation additive is intended to increase the corn oil yield.

WO2012/128858 of Hercules Incorporated discloses the use of polyoxyethylene(20) sorbitan mono-laurate (polysorbate 20), polyoxyethylene(20)sorbitan mono-stearate (polysorbate 60) and polyoxyethylene(20)sorbitan mono-oleate (polysorbate 80) as corn oil separation additives. The specific additives disclosed in WO2012/128858 are all based on sorbitan and although the yield of corn oil obtained from stillage in the presence of such additives is improved, there can still be a significant amount of corn oil left un-collected, and discharged unseparated from the stillage as part of a product with lower commercial value. The composition of the stillage can vary considerably as can the effectiveness of the sorbitan derivatives as oil separation aids with different stillages. There is a need for alternative or improved separation additives which are also effective with a wider range of stillages.

The present invention seeks to aid the recovery of oil from a wide range of aqueous compositions, particularly from different biomass materials, and especially from different stillages.

SUMMARY OF THE INVENTION

We have surprisingly discovered a method of separating or recovering oil which overcomes or significantly reduces at least one of the aforementioned problems. Accordingly, the present invention provides a method of separating oil from a composition comprising an oil and water emulsion, which comprises adding a separation additive to the composition and performing at least one oil separation step, wherein the separation additive comprises a mixture of a fatty ester of an alkoxylated polyol and a fatty ester of alkoxylated glycerol.

The invention also provides a stillage and product derived therefrom comprising a mixture of a fatty ester of an alkoxylated polyol and a fatty ester of alkoxylated glycerol.

The invention further provides a separation additive comprising a mixture of a fatty ester of an alkoxylated polyol and a fatty ester of alkoxylated glycerol.

The invention still further provides the use of a separation additive comprising a mixture of a fatty ester of an alkoxylated polyol and a fatty ester of alkoxylated glycerol to separate oil from stillage.

All of the features described herein may be combined with any of the above aspects of the invention, in any combination.

The oil containing composition is suitably a biomass, by which is generally meant organic matter harvested or collected from a biological source. The biological source is preferably renewable and includes plant materials (e.g. plant biomass), animal materials, microbial materials such as bacteria, fungi and algae, and/or materials produced biologically. The biomass will normally contain glycerides (e.g. tri-, di-, and/or mono-glyceride).

In one preferred embodiment, the composition or biomass is stillage, by which is meant a co-product or by-product produced during production of a biofuel, particularly when using corn as feedstock. The term "stillage" can refer to whole stillage, thin stillage, or concentrated stillage such as condensed distillers soluble, i.e. syrup, which can be produced from biofuel process streams, e.g. bioethanol production process streams. The term "polyol" is well known in the art, and refers to an alcohol comprising more than one hydroxyl group. Polyols obtained from natural sources are preferred for use herein.

When a polyol is alkoxylated or esterified, a polyol reaction residue is produced which is an organic radical derived from the polyol by removal of one or more active hydrogen atoms, each active hydrogen atom being from one of the hydroxyl groups present in the polyol. Since the number of hydroxyl groups in the polyol is equivalent to the number of active hydrogen atoms, the preferred number of hydroxyl groups present in the polyol will be the same as the preferred number of active hydrogen atoms.

The polyol defined herein is not glycerol and preferably comprises greater than 3 carbon atoms. The polyol is suitably a C4 to C20 polyol, preferably a C5 to C15 polyol, more preferably a C6 to C10 polyol, particularly a C7 to C9, and especially a C8 polyol.

The polyol may be a sugar, a sugar alcohol and/or a polyglycerol, preferably a sugar and/or a polyglycerol, and more preferably a sugar.

The sugar suitably comprises in the range from 4 to 25, more preferably 5 to 12, particularly 7 to 9, and especially 8 carbon atoms.

The sugar may be a monosaccharide, disaccharide, tetrasaccharide and/or oligo- or polysaccharide. Suitable monosaccharides include glucose, fructose and galactose. Suitable disaccharides include sucrose, maltose, lactose, cellobiose, trehalose and lactulose. The sugar preferably comprises, consists essentially of, or consists of a monosaccharide and/or disaccharide, more preferably a disaccharide, and particularly sucrose.

The sugar alcohol suitably has the molecular formula $C_aH_{2a+2}O_a$, wherein the value "a" is preferably in the range from 4 to 24, more preferably 5 to 12, and particularly 6. Suitable sugar alcohols include erythritol (4-carbon), threitol (4-carbon), arabitol (5-carbon), xylitol (5-carbon), ribitol (5-carbon), mannitol (6-carbon), sorbitol (6-carbon), galactitol (6-carbon), fucitol (6-carbon), and/or iditol (6-carbon).

The sugar alcohol may be selected from the group consisting of erythritol, threitol, arabitol, xylitol, ribitol, mannitol, sorbitol, galactitol, fucitol and iditol.

The polyglycerol preferably comprises on average in the range from 2 to 10, more preferably 2.5 to 5, particularly 3 to 4, and especially 3.4 to 3.6 glycerol molecules. The fatty component of the fatty ester of an alkoxylated polyol and fatty ester of alkoxylated glycerol is generally derived from fatty acids or derivatives thereof. Preferably, the fatty esters are derived from fatty acids and/or derivatives thereof. The fatty acids are preferably mono-carboxylic acids and may be linear and/or branched, saturated and/or unsaturated. Unsaturated fatty acids are preferred. The unsaturated fatty acids may be mono-unsaturated, di-unsaturated and/or poly-unsaturated. Linear fatty acids are preferred.

The fatty acids suitably have at least 6 carbon atoms, preferably at least 10 carbon atoms, more preferably at least 12 carbon atoms, particularly at least 14 carbon atoms, and especially at least 16 carbon atoms. The fatty acids preferably have at most 24 carbon atoms, more preferably at most 22 carbon atoms, and particularly at most 20 carbon atoms. Preferably the fatty acids have in the range from 6 to 24, more preferably 14 to 22, and particularly 16 to 20 carbon atoms.

Suitable saturated fatty acids may be selected from the group consisting of hexanoic (caproic), octanoic (caprylic), nonanoic, decanoic (capric), undecanoic, dodecanoic (lauric), tridecanoic, tetradecanoic (myristic), 2-ethyl hexanoic, trimethylhexanoic, trimethylnonanoic, hexadecanoic (palmitic), octadecanoic (stearic), isostearic, decadecanoic, acids and mixtures thereof. Suitable unsaturated fatty acids may be selected from the group consisting of oleic, ricinoleic, linoleic, linolenic, acids and mixtures thereof. The unsaturated fatty acids may be selected from the group consisting of oleic acid, linoleic acid and mixtures thereof. Oleic acid is a preferred unsaturated fatty acid.

The fatty acids are preferably mixtures obtained from natural sources, such as, for example, plant or animal esters, particularly triglycerides. Fatty acids derived from plant sources are preferred. Suitable natural sources include those selected from the group consisting of canola oil, castor oil, soya bean oil, corn oil, tall oil, palm kernel oil, coconut oil, rapeseed oil, high erucic rapeseed oil, tallow oil and mixtures thereof. Soya bean fatty acids are particularly preferred.

In one preferred embodiment, the fatty component of the fatty ester of an alkoxylated polyol and the fatty component of the fatty ester of alkoxylated glycerol are the same, more preferably both derived from fatty acids, particularly comprising, consisting essentially of, or consisting of, soya bean fatty acids.

The fatty ester of an alkoxylated polyol and/or fatty ester of alkoxylated glycerol are preferably partial esters, i.e. preferably they are not fully esterified.

For the fatty ester of an alkoxylated polyol, the ratio of the average number ester bonds or fatty chains (e.g. fatty acid residues) to hydroxyl groups originally present in the polyol is suitably in the range from 0.1 to 0.9:1, preferably 0.2 to 0.8:1, more preferably 0.3 to 0.7:1, particularly 0.4 to 0.6:1, and especially 0.45 to 0.55:1.

The fatty ester of alkoxylated glycerol preferably comprises on average less than 3 ester bonds or fatty chains (e.g. fatty acid residues). The fatty ester of alkoxylated glycerol suitably comprises on average in the range from 1 to 2.5, preferably 1.2 to 2.0, more preferably 1.3 to 1.8, particularly 1.4 to 1.6, and especially 1.45 to 1.55 ester bonds (or fatty chains).

The alkylene oxide groups of the fatty ester of an alkoxylated polyol and fatty ester of alkoxylated glycerol are typically present as polyalkylene oxide chains of the formula: —$(C_rH_{2r}O)_n$— where n is the number of alkylene oxide groups in the chain, r is 2, 3 or 4, preferably 2 or 3, i.e. an ethyleneoxy (—$C_2H_4O$—) or propyleneoxy (—$C_3H_6O$—) group. Preferably the fatty ester of an alkoxylated polyol and/or fatty ester of alkoxylated glycerol comprises a polyalkylene oxide chain. There may be different alkylene oxide groups along the polyalkylene oxide chains. Preferably, it is desirable that the chain is a homopolymeric ethylene oxide chain. However, the chain may be a homopolymeric chain of propylene oxide residues or a block or random copolymer chain containing both ethylene oxide and propylene oxide residues. Where co-polymeric chains of ethylene and propylene oxide units are used, the molar proportion of ethylene oxide units used is suitably at least 50 mol %, preferably at least 70 mol %, more preferably at least 80 mol %, and particularly at least 90 mol %.

The average number of alkylene oxide groups in the polyalkylene oxide chains of the fatty ester of an alkoxylated polyol and/or fatty ester of alkoxylated glycerol, i.e. the value of the each parameter n, is suitably in the range from 1 to 20, preferably 3 to 15, more preferably 5 to 12, particularly 7 to 10, and especially 8 to 9. The value of the index n is an average value, which includes statistical variation in the chain length.

In one preferred embodiment, the ratio of the average number of alkylene oxide, preferably ethylene oxide, groups in the polyalkylene oxide chains of the fatty ester of an alkoxylated polyol to the average number of alkylene oxide, preferably ethylene oxide, groups in the polyalkylene oxide chains of the fatty ester of alkoxylated glycerol is suitably in the range from 0.3 to 3:1, preferably 0.5 to 2:1, more preferably 0.8 to 1.2:1, particularly 0.9 to 1.1:1, and especially 1:1.

The total number of alkylene oxide, preferably ethylene oxide, groups in the polyalkylene oxide chains of the fatty ester of an alkoxylated polyol (i.e. the average number of alkylene oxide groups in the chains (parameter n)×the number of chains) is suitably in the range from 20 to 120, preferably 40 to 90, more preferably 50 to 80, particularly 55 to 75, and especially 60 to 70.

The total number of alkylene oxide, preferably ethylene oxide, groups in the polyalkylene oxide chains of the fatty ester of alkoxylated glycerol (i.e. the average number of alkylene oxide groups in each chains (parameter n)×the number of chains) is suitably in the range from 6 to 40, preferably 12 to 35, more preferably 18 to 30, particularly 20 to 28, and especially 22 to 26.

In one preferred embodiment, the ratio of the total number of alkylene oxide, preferably ethylene oxide, groups in the polyalkylene oxide chains of the fatty ester of an alkoxylated polyol to the total number of alkylene oxide, preferably ethylene oxide, groups in the polyalkylene oxide chains of the fatty ester of alkoxylated glycerol is suitably in the range from 1 to 5:1, preferably 2 to 3.5:1, more preferably 2.3 to 3.0:1, particularly 2.5 to 2.8:1, and especially 2.6 to 2.7:1.

The separation additive used herein preferably comprises in the range from 20 to 60 wt %, more preferably 30 to 50 wt %, particularly 35 to 43 wt %, and especially 38 to 40 wt % of fatty ester of an alkoxylated polyol, based on the total weight of the separation additive.

The separation additive used herein preferably comprises in the range from 25 to 65 wt %, more preferably 35 to 55 wt %, particularly 40 to 50 wt %, and especially 44 to 46 wt % of fatty ester of alkoxylated glycerol, based on the total weight of the separation additive.

The ratio by weight of the fatty ester of an alkoxylated polyol to the fatty ester of alkoxylated glycerol in the separation additive is suitably in the range from 0.3 to 3:1, preferably 0.5 to 1.8:1, more preferably 0.6 to 1.2:1, particularly 0.8 to 0.95:1, and especially 0.85 to 0.9:1.

The fatty ester of an alkoxylated polyol and fatty ester of alkoxylated glycerol used herein may be produced separately in a conventional manner, and then mixed together in the required ratio to form the separation additive composition. The process, for example, may comprise firstly alkoxylating the polyol or glycerol, by techniques well known in the art, for example by reacting with the required amounts of alkylene oxide, for example ethylene oxide and/or propylene oxide.

The second stage of the process may comprise reacting the alkoxylated polyol residue or alkoxylated glycerol residue with a fatty acid or a derivative thereof. The direct reaction between the fatty acid and the alkoxylated precursor can be carried out, with or without catalysts, by heating preferably to a temperature of greater than 100° C., more preferably in the range from 200 to 250° C. Synthesis using reactive derivatives will usually be possible under milder conditions, for example using lower fatty acid esters, fatty acid chlorides and/or their respective anhydrides. Purification of the reaction product is not usually necessary, but can be carried out if desired.

Generally the alkoxylation reaction will replace all of the active hydrogen atoms in the polyol or glycerol molecule. However, reaction at a particular site may be restricted or prevented by steric hindrance or suitable protection. The terminating hydroxyl groups of the polyalkylene oxide chains in the resulting compounds are then available for reaction with acyl compounds to form ester linkages.

In one preferred embodiment, both the fatty ester of an alkoxylated polyol and fatty ester of alkoxylated glycerol are produced together in a transesterification/alkoxylation process, more preferably when using a polyol and a triglyceride as starting material. Preferably, the separation additive is obtainable by alkoxylating a mixture of a polyol and a triglyceride. The polyol (e.g. sucrose) and triglyceride (e.g. soya bean oil) can be charged into a reactor vessel together with a base catalyst (such as NaOH or KOH, normally in aqueous solution at 40 to 50% active levels). With agitation on, the reaction vessel is preferably heated to about 100° C. and a vacuum applied to remove water. After purging with nitrogen, the reaction vessel is preferably heated to about 140° C., and alkylene oxide, for example ethylene oxide and/or propylene oxide, gradually introduced into the reaction vessel. The addition of alkylene, preferably ethylene, oxide may take from about 3 to 6 hours, and up to 20 hours to complete at 140 to 155° C. An additional 3 to 6 hours may be required to complete the reaction. The separation additive may also comprise an amount of alkoxylated, preferably ethoxylated, fatty ester which may be formed during the synthesis of the fatty ester of an alkoxylated polyol and/or fatty ester of alkoxylated glycerol. The alkoxylated fatty ester may be a mono-ester, di-ester or a mixture thereof.

The fatty component of the alkoxylated fatty ester may be the same or different to that of the fatty component of the fatty ester of an alkoxylated polyol and/or fatty ester of alkoxylated glycerol. In one preferred embodiment, the fatty component of the alkoxylated fatty ester is the same as the fatty component of both the fatty ester of an alkoxylated polyol and the fatty ester of alkoxylated glycerol, more preferably being derived from soya bean fatty acids.

The separation additive composition preferably comprises in the range from 0.5 to 15 wt %, more preferably 3 to 12 wt %, particularly 5 to 10 wt %, and particularly 7 to 9 wt % of alkoxylated fatty ester, based on the total weight of the separation additive. The separation additive composition may also comprise an amount of alkoxylated, preferably ethoxylated, glycerol. The separation additive preferably comprises in the range from 0.1 to 10 wt %, more preferably 1 to 8 wt %, particularly 4 to 6 wt %, and particularly 4.5 to 5.5 wt % of alkoxylated glycerol, based on the total weight of the separation additive.

The separation additive composition may also comprise an amount of polyalkylene, preferably polyethylene, oxide. The separation additive preferably comprises in the range from 0.1 to 10 wt %, more preferably 1 to 5 wt %, particularly 2 to 3 wt %, and particularly 2.5 to 3.5 wt % of polyalkylene oxide, based on the total weight of the separation additive.

The separation additive preferably has a hydroxyl value (measured as described herein) in the range from 55 to 120, more preferably 70 to 105, particularly 80 to 95, and especially 85 to 90 mgKOH/g; an acid value (measured as described herein) preferably less than 3, more preferably less than 1, particularly less than 0.8, and especially less than 0.7 mgKOH/g; and/or a saponification value (measured as described herein) in the range from 50 to 115, more preferably 65 to 100, particularly 75 to 90, and especially 80 to 85 mgKOH/g.

The separation additive suitably has a HLB value (calculated using Griffin's method as is well known in the art) in the range from 11 to 15, preferably 12 to 14, more preferably 12.2 to 13.6, particularly 12.6 to 13.4, and especially 12.8 to 13.2.

The separation additive is preferably liquid at 25° C., more preferably also liquid at 20° C., particularly also liquid at 15° C., and especially also liquid at 10° C.

Preferably the separation additive is acceptable for animal consumption. This may be required because the composition treated with the separation additive and/or the separated components thereof may be used for animal consumption. For example, treated stillage may be used in the production of distillers' dried grains (DDG) or distillers' dried grains with solubles (DDGS). DDG or DDGS may be used as an animal feedstock. Preferably the separation additive is acceptable for animal consumption. The separation additive may be generally recognized as safe (GRAS).

The requirement that the separation additive is acceptable for animal consumption may also influence the concentration of additive which may be added to the composition, preferably stillage. This is because there will typically be an upper concentration limit specified for the presence of the separation additive in the animal feedstock so that it is acceptable for animal consumption. This upper concentration limit may determine the maximum concentration of separation additive which may be added to the stillage. For GRAS, the maximum concentration of separation additive which may be added to the composition may be 1,000 ppm by weight. If the maximum concentration of separation additive in the composition is determined by the presence of the additive in the animal feedstock then an additive with a higher separation performance will be preferred to increase the oil yield.

The separation additive may be added to the composition, preferably stillage at a dosage of at most 4,000 parts per million (ppm) of separation additive based on the weight of the composition. The separation additive may be added at a dosage of at most 3,000 ppm, preferably at most 2,000 ppm, more preferably at most 1,500 ppm, particularly at most 1,000 ppm, and especially at most 800 ppm. The separation additive may be added at a dosage of at least 50 ppm, preferably at least 100 ppm, more preferably at least 200 ppm, and particularly at least 300 ppm.

The separation additive may be added at a dosage of at most 1,000 ppm to satisfy the requirements to be GRAS. Preferably the separation additive is added at a dosage rate of at least 50 ppm and at most 1,000 ppm based on the weight of the composition, preferably stillage.

In general, the process steps in ethanol production which include the distillation which separates ethanol from the whole stillage and the further downstream process steps are known as 'back-end' process steps. A typical process flow for the back-end process steps may include:
1. Distillation to separate ethanol from the whole stillage;
2. Centrifugation of the whole stillage to produce thin stillage and wet cake;
3. Evaporation of the thin stillage to produce steam and syrup (dewatered thin stillage); and
4. Drying of the syrup to produce DDGS.

The ethanol production process may be a Delta T or ICM corn to ethanol production process.

The method of the present invention may be used with whole stillage, thin stillage or syrup. Preferably the separation additive is added to a whole stillage or a thin stillage.

The stillage typically comprises fibre, protein, lipids and yeast. The oil phase of the stillage may include triglycerides.

The separation operation in the method of the invention may comprise one or more of a centrifugation operation, evaporation operation and drying operation.

Preferably, the separation operation includes centrifugation, and the separation additive is added to the stillage before or during centrifugation. Preferably, the separation additive is added to the stillage before the centrifugation occurs. The separation additive may be added after the majority of ethanol has been distilled away and before centrifugation.

Centrifugation may occur for at least one minute, preferably at least two minutes, more preferably at least 3 minutes. Centrifugation may occur for up to 15 minutes, preferably up to 10 minutes, more preferably up to 6 minutes.

The time between the separation additive being added to the stillage and the oil phase being separated from the stillage may be at least thirty seconds, preferably at least one minute, more preferably at least two minutes, and particularly at least 3 minutes. The time between the separation additive being added to the stillage and the oil phase being separated from the stillage may be up to 24 hours, preferably up to 12 hours, more preferably up to 4 hours, and particularly up to 1 hour. The time between the separation additive being added to the stillage and the oil phase being separated from the stillage may be up to 45 minutes, preferably up to 30 minutes, more preferably up to 15 minutes, and particularly up to 10 minutes.

The method according to the present invention may be performed above room temperature. The method may be performed at a temperature of at least 30° C., preferably at least 50° C., more preferably at least 70° C. The method may be performed at a temperature of at most 95° C., preferably at most 90° C. If the method is performed at a higher temperature, the oil phase and water phase of the composition may separate more quickly. The separation additive may advantageously lower the temperature required to achieve a predetermined amount of separation by increasing the amount of the oil phase which is separated in a predetermined time without requiring a higher temperature. This may reduce the amount of heat energy (and therefore cost) required for the separation operation.

The method of the present invention may increase the amount of the oil phase separated from the composition, preferably stillage, when compared with a separation method in which no separation additive is used. The separation of an increased amount of the oil phase from the stillage may improve the corn oil yield of the process. The separation of an increased amount of the oil phase from the stillage may also reduce the amount of oily deposits on stillage process equipment downstream of the separation. This may reduce the need for cleaning of the equipment and so may reduce the amount of downtime required to maintain the equipment.

In addition, the oil, preferably corn oil, recovered using the method of the present invention may be of improved quality. The oil recovered may have a lower solids content or a lower water content than oil recovered without using the separation additive of the present invention.

As shown in the examples below, the separation additive may perform better than an equivalent amount by weight of polysorbate 80. Better performance in this context should be understood to mean that more of the oil phase is separated by the separation additive from an equivalent amount of stillage under an equivalent separation operation than is separated by an equivalent amount by weight of polysorbate 80.

A predetermined amount of the separation additive may enable at least 10% more of the oil phase to be separated from a composition, preferably stillage, than an equivalent amount by weight of polysorbate 80 under equivalent separation conditions. Preferably the separation additive may enable at least 15% more of the oil phase to be separated from the composition, preferably stillage, than an equivalent amount by weight of polysorbate 80, more preferably at least 20% more, and particularly at least 30% more. The separation additive may enable at most 100% more of the oil phase to be separated than an equivalent amount by weight of polysorbate 80, preferably at most 90% more, more preferably at most 70% more. The increase in oil phase separation may be measured by volume.

The predetermined amount may be at most 1,000 ppm, preferably is 400 ppm, of separation additive based on the weight of the composition, preferably stillage.

All of the features described herein may be combined with any of the above aspects of the invention, in any combination. In addition, any upper or lower quantity or range limit used herein may be independently combined.

In this specification the following test methods were used:

i) Corn Oil Separation

Thin stillage samples obtained from corn ethanol plants were stored in a refrigerator to keep from being spoiled. Prior to the test, a stillage sample was taken out of the refrigerator and heated to 82° C. in an oven. 40 ml of the pre-heated stillage sample was added to a 50 ml centrifuge tube, and 400 ppm of separation additive was added into the sample. The sample was centrifuged at 7,000 rpm for 3 minutes. The height of the clear oil layer was measured (in mm) with a ruler.

ii) Acid Value

The acid value of the separation additive was determined by using ASTM D1980-87 (Standard test method for acid value of fatty acids and polymerised fatty acids).

iii) Hydroxyl Value

The hydroxyl value of the separation additive was measured by using ASTM D1957-86 (Standard test method for hydroxyl value of fatty oils and acids).

iv) Saponification Value

The saponification value of the separation additive was measured by using ASTM D5558 (Standard test method for vegetable and animal fats).

v) Chemical Composition

The chemical composition of the separation additive was determined by Maldi-MS. Three solutions were prepared. One contained the separation additive sample in chloroform at a volume concentration of 1%. The second contained dithranol, a common matrix used for MALDI mass spectrometry, dissolved in chloroform at a volume concentration of 1%. The third contained potassium bromide dissolved in methanol at a volume concentration of 1%. Portions of the three solutions were combined in volume ratios of 100 parts matrix solution, 20 parts sample solution, and 1 part potassium bromide solution. A one-microliter sample of this mixture was spotted onto a MALDI plate, upon which it dried immediately. The MALDI spectrum was acquired using a Bruker autoflex speed MALDI mass spectrometer, operated in reflector mode. Immediately prior to collection of the spectrum of the sample, the mass scale of the instrument was calibrated using a mixture of peptides provided by Bruker for this purpose. The spectrum was imported into the data analysis program Polymerix™ (Ver. 3.0.0) from Sierra Analytics, Inc. Peaks were assigned based on knowledge of the reaction chemistry and best fits to the data.

The invention is illustrated by the following non-limiting examples.

EXAMPLE 1

A mixture of a fatty ester of alkoxylated sucrose and a fatty ester of alkoxylated glycerol was produced in a one pot process using the materials listed in Table 1.

TABLE 1

| Raw Material | Wt (g) | Molar Ratio | Wt. % |
| --- | --- | --- | --- |
| Sucrose (co-milled with 14.5% Potassium Stearate) | 92.5 | 1.0 | 5.8 |
| Soya Bean Oil (ex Cargill) | 552.5 | 2.7 | 35.0 |
| Ethylene Oxide | 934.0 | 92 | 59.2 |
| Total | 1578 | | 100.0 |
| KOH (45%) | 2.0 | | ~0.07 |
| $H_3PO_4$ | 2.0 | | |

Reaction Process:

i) The soya bean oil and catalyst (caustic potash, 45%) were added to a clean and dry 2-L pressurized Parr reactor at ambient temperature.

ii) The reactor was heated slowly to 100° C. with agitation and nitrogen sweep on.

iii) As the temperature was increased, vacuum was applied to remove water.

iv) Once the residual water was reduced to below 0.2% at temperature range of 90 to 100° C., the sucrose (co-milled with potassium stearate at 14.5%) was added.

v) With agitation on, the reaction mixture was purged with nitrogen and the reactor temperature increased to 130° C.

vi) The ethylene oxide was fed into the reactor at the temperature range of 130 to 150° C. The ethylene oxide feeding rate was controlled so that the reactor pressure did not exceed 50 psig.

vii) Once all the ethylene oxide had been added, the reactor pressure was allowed to decrease at the reaction temperature range of 140 to 150° C. After the pressure drop reached a steady low rate, the reaction was continued for another 2 hours.

viii) Vacuum was gradually applied to 20 torr or less in order to remove any unreacted ethylene oxide. The reactor temperature and vacuum were held for another 1 to 2 hours.

iix) The reactor temperature was allowed to cool to 60 to 65° C., the product was neutralized with phosphoric acid, and the reaction product was then discharged. The reaction product had an acid value of 0.6 mg KOH/g, a hydroxyl value of 87.6 mg KOH/g and a saponification value of 82.1 mg KOH/g.

EXAMPLE 2

The product produced in Example 1 was used as a separation additive in the corn oil separation test described herein using stillage sample from different corn ethanol plants. 5 samples from 3 stillages (Stillages A, B and C) were treated and the height of the clear oil layer (indicating the separation performance) was measured in millimeters (mm) for each sample. The average height was calculated. The results are shown in Table 2. Stillage A, Stillage B and Stillage C are representative stillages from different types of corn at different ages of harvest.

TABLE 2

| | Sample No | | | | | Average |
| --- | --- | --- | --- | --- | --- | --- |
| | 1 | 2 | 3 | 4 | 5 | (mm) |
| Stillage A | 3 | 5 | 5 | 4 | 4 | 4.2 |
| Stillage B | 5 | 5 | 5 | 5 | 5 | 5 |
| Stillage C | 5 | 5 | 5 | 5 | 5 | 5 |

EXAMPLE 3

This is a Comparative Example not according to the invention. The procedure of Example 2 was repeated except that polysorbate 80 was used as the separation additive instead of the product produced in Example 1. The results are shown in Table 3.

TABLE 3

| Sample No | Average (mm) |
|---|---|
| Stillage A | 5.4 |
| Stillage B | 1 |
| Stillage C | 3 |

The above examples illustrate the improved properties of a separation additive, and use thereof, according to the present invention.

It is to be understood that the invention is not to be limited to the details of the above embodiments, which are described by way of example only. Many variations are possible.

The invention claimed is:

1. A method of separating oil from a composition comprising an oil and water emulsion, which comprises adding a separation additive to the composition and performing at least one oil separation step, wherein the separation additive comprises a mixture of a fatty ester of an alkoxylated polyol and a fatty ester of alkoxylated glycerol, wherein the polyol comprises greater than 3 carbon atoms.

2. The method according to claim 1 wherein the polyol is a sugar.

3. The method according to claim 2 wherein the sugar is sucrose.

4. The method according to claim 1 wherein the fatty esters are derived from fatty acids and/or derivatives thereof.

5. The method according to claim 4 wherein the fatty acids comprise soya bean fatty acids.

6. The method according to claim 4 wherein the fatty ester of an alkoxylated polyol and the fatty ester of alkoxylated glycerol comprise fatty acid residues having the same composition.

7. The method according to claim 1 wherein the separation additive is obtainable by alkoxylating a mixture of a polyol and a triglyceride.

8. The method according to claim 1 wherein the ratio of the number of ester bonds in the fatty ester of an alkoxylated polyol, to hydroxyl groups present in the polyol starting material, is 0.3 to 0.7:1.

9. The method according to claim 1 wherein the fatty ester of alkoxylated glycerol comprises 1.3 to 1.8 ester bonds.

10. The method according to claim 1 wherein the fatty ester of an alkoxylated polyol comprises a polyalkylene oxide chain and wherein the total number of alkylene oxide groups in the polyalkylene oxide chains of the fatty ester of an alkoxylated polyol is 40 to 90.

11. The method according to claim 1 wherein the fatty ester of alkoxylated glycerol comprises a polyalkylene oxide chain and wherein the total number of alkylene oxide groups in the polyalkylene oxide chains of the fatty ester of alkoxylated glycerol is 12 to 35.

12. A stillage and product derived therefrom comprising a mixture of a fatty ester of an alkoxylated polyol and a fatty ester of alkoxylated glycerol, wherein the polyol comprises greater than 3 carbon atoms.

13. A separation additive comprising a mixture of a fatty ester of an alkoxylated polyol and a fatty ester of alkoxylated glycerol, wherein the polyol comprises greater than 3 carbon atoms.

14. The separation additive according to claim 13 obtainable by alkoxylating a mixture of a polyol and a triglyceride.

15. The method according to claim 1 wherein the composition comprising an oil and water emulsion is stillage.

16. The method according to claim 15, wherein the stillage is selected from whole stillage, thin stillage, and concentrated stillage.

17. The method according to claim 15, wherein the oil is corn oil.

* * * * *